Jan. 16, 1951   A. PIEL ET AL   2,538,121
BEET TOPPING MACHINE

Filed Dec. 5, 1947   2 Sheets-Sheet 1

Inventors
Arnold Piel
Sam Piel
Edward Piel
Ferdinand Piel &
Adam Piel

By Randolph & Beavers
Attorneys

Jan. 16, 1951
A. PIEL ET AL
2,538,121
BEET TOPPING MACHINE
Filed Dec. 5, 1947
2 Sheets-Sheet 2
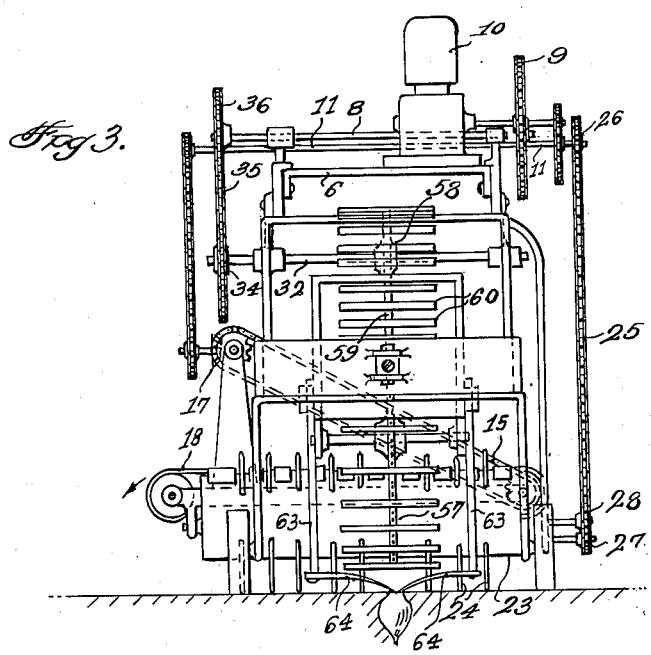
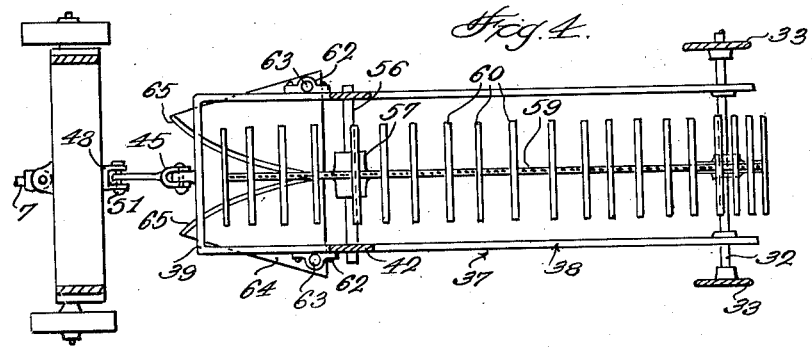
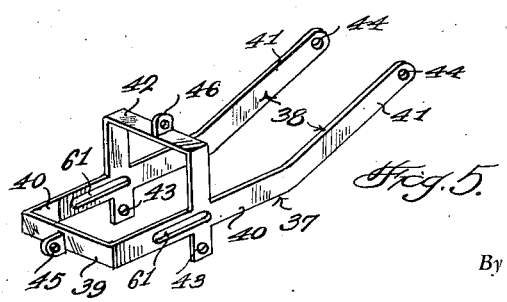
Inventors
Arnold Piel
Sam Piel
Edward Piel
Ferdinand Piel &
Adam Piel
By Randolph & Beavers
Attorneys Patented Jan. 16, 1951

2,538,121

UNITED STATES PATENT OFFICE 2,538,121

BEET TOPPING MACHINE

Arnold Piel, Adam Piel, Sam Piel, Ferdinand Piel, and Edward Piel, Worland, Wyo.

Application December 5, 1947, Serial No. 789,800

2 Claims. (Cl. 56—192)

This invention relates to a beet topping machine or implement adapted to be employed as a trailer vehicle to be drawn behind a draft vehicle, such as a tractor and which is operative for topping a row or rows of beets before the beets are unearthed and harvested.

More particularly, it is a primary object of the present invention to provide a novel structure for cutting off the beet tops and for conveying the cut tops away from the cutting means and in a direction to be engaged by pickup means by which the cut tops are handled and finally discharged transversely from the implement and into a windrow whereby to insure removal of the beet tops from the beet row and from the topping means of the implement.

Still a further object of the invention is to provide an implement having a novel supporting frame for adjustably supporting the beet topping means and the initial conveying means for the beet tops after they are severed from the beets.

Various other objects and advantages of the invention will hereinafter become more fully apparent from the following description of the drawings, illustrating a preferred embodiment thereof, and wherein:

Figure 3 is an end elevational view looking from front to rear of the implement or from left to right of Figures 1 and 2;

Figure 4 is a horizontal sectional view taken substantially along a plane as indicated by the line 4—4 of Figure 1, and Figure 5 is a perspective view of a frame structure constituting a part of the beet topper.

Figure 1:
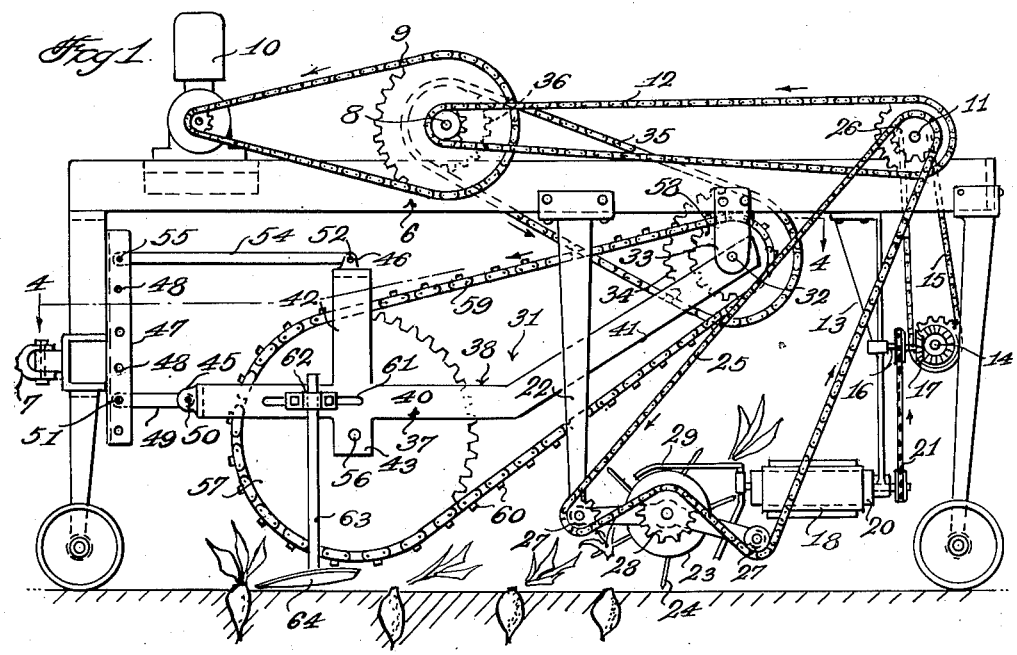
Figure 1 is a side elevational view of the beet topper.
Figure 2:
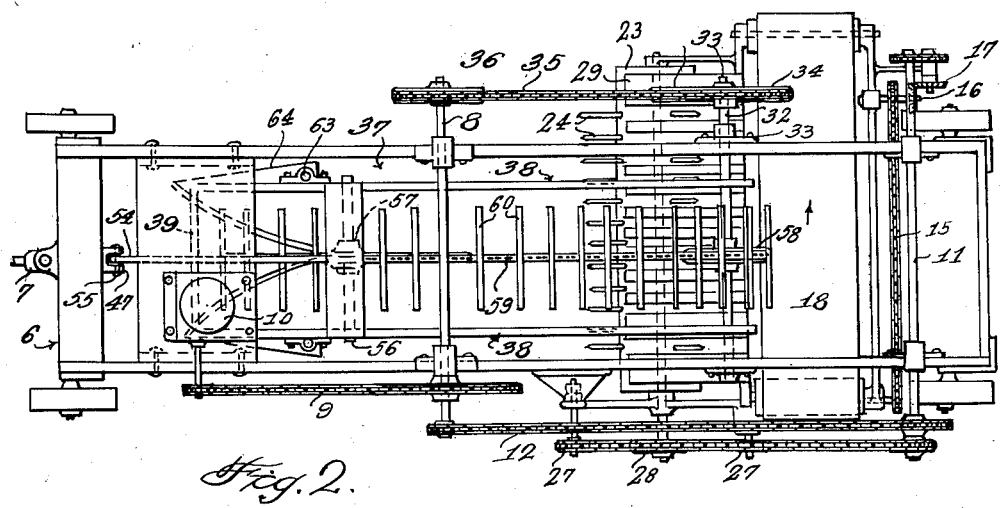
Figure 2 is a top plan view thereof.

Referring more specifically to the drawings, for the purpose of illustrating a preferred application and use of the invention, hereinafter to be described, the numeral 6 designates generally a wheeled frame which is adapted to be attached by coupling means 7 to a suitable draft vehicle such as a tractor, not shown and which is provided with bearing means on the upper portion of said frame for journaling a shaft 8 which is disposed transversely thereof and which may either be driven by suitable power take-off means from the tractor or by chain and sprocket wheel connection 9 to the driven shaft of a prime mover or motor 10 mounted on the frame 6. A second shaft 11 is journaled transversely in the upper portion of the frame 6 and adjacent the rear end thereof and is connected by chain and sprocket wheel means 12 to the shaft 8 to be driven thereby. The upper portion of the frame 6, adjacent the rear end thereof, supports a depending hanger structure 13 having bearing means for journaling a shaft 14 which is likewise disposed transversely of the frame 6 and which is driven from the shaft 11 by sprocket wheel and chain means 15 and which in turn drives a shaft 16 which is disposed transversely thereto and also journaled in the hanger structure 13 by a bevel gear connection 17. An endless conveyer 18 which is disposed transverse to the frame 6 is supported by the depending hanger structure 13 and includes a driven drum 19 having a drum shaft 20 journaled in the hanger structure 13 and connected by an endless belt and pulley connection 21 to the shaft 16 whereby when the means 12, 15 and 21 are driven in the directions as indicated by the arrows in Figure 1 the upper flight of the endless conveyer 18 will be driven in the direction as indicated by the arrow of Figure 2. The frame 6 also includes a forward depending hanger structure 22 providing a support and journal for a pickup means 23 including a driven rotary drum having a series of radially projecting tines 24 and which is driven in a clockwise direction as seen in Figure 1 by an endless chain 25 which is trained over and driven from a sprocket wheel 26 keyed to the shaft 11 and which is trained under idler sprocket wheels 27 journaled by the frame structure 22 and over the sprocket wheel 28 which is connected to the drum of the pickup means 23. The pickup means 23 is disposed forwardly of and adjacent the endless conveyer 18 and has a slotted plate 29 positioned over the upper part of the drum thereof and through the slots of which the tines 24 are movable so that the beet tops 30 picked up by said tines 24 will be removed from said tines by their movement through and out of engagement with the slots of the plate 29 whereby said beet tops 30 will be directed by the plate 29 onto the endless conveyer 18 and discharged laterally from the upper flight thereof in a windrow to one side of the machine or implement. The parts previously described constitute no part of the present invention but have been illustrated and described briefly to better afford an understanding of the invention hereinafter to be described and designated generally 31.

The invention 31, constituting an improvement of the beet topping implement or machine, includes a shaft 32 which is disposed transversely of and beneath the upper portion of the frame 6 and which is journaled in bearings 33 which depend therefrom. A sprocket wheel 34 is keyed to the shaft 32 and is connected by an endless chain 35 to a sprocket wheel 36 which is keyed to the shaft 8 and so that the chain 35 will be driven in the direction as indicated by the arrow in Figure 1 for revolving the shaft 32 counterclockwise, as seen in Figure 1.

A frame, designated generally 37 includes spaced, substantially parallel arms 38 which are joined at their forward ends by cross piece 39 and which include substantially straight forward portions 40 and upwardly inclined rear portions 41. The forward portions 40 are likewise joined intermediate of their ends by an arch portion 42 the depending legs of which are formed integral therewith and said leg portions 40 are also provided with depending bearing portions 43 which align with the legs of the arch portion 42. The rear ends of the upwardly inclined leg portions 41 are provided with aligned bearing openings 44 in which portions of the shaft 32 are journaled and by means of which the frame 37 is pivotally supported within the frame 6 for vertical movement relatively thereto. As seen in Figure 1, the frame 37 extends forwardly from the shaft 32 and the cross piece 39 thereof is provided with a forwardly projecting apertured ear 45 and the cross piece of the portion of the arch 42 is provided with a similar apertured ear 46.

The frame 6 includes a forwardly disposed cross piece to the rear side of which is secured an upright channel bar 47 which opens rearwardly and the sides of which are provided with aligned, longitudinally spaced apertures 48. A rigid connecting link 49 is connected by fastening 50 at its rear end to the apertured ear 45 and is connected at its forward end to a fastening 51 which engages aligned apertures 48. The ear 46 is similarly connected by a fastening 52 to the rear end of a link 54 which extends forwardly therefrom and which is connected at its forward end to a fastening 55 which likewise engages aligned apertures of the channel bar 47 and so that said links 49 and 54 combine to support the forward end of the frame 37 and by adjustably attaching the link members 49 and 54 to the channel bar 47 the elevation of the forward portion of the frame 37 can be varied.

A shaft 56 is journaled by the bearings 43 of the frame 37 and mounts a large sprocket wheel 57 which is rotatably supported thereby within the frame 37. A smaller sprocket wheel 58 is keyed to the shaft 32 and is disposed centrally of the frame 37 and in alignment with the sprocket wheels 57 and an endless chain 59 is trained over said sprocket wheel and is driven by the sprocket wheel 58 in a counterclockwise direction, as indicated by the arrow in Figure 1. The chain 59 is provided on its outer side with longitudinally spaced, transversely extending slats 60, for a purpose which will hereinafter be described.

The leg portions 40 of the frame 37 are provided with corresponding elongated openings 61 in each of which is adjustably mounted a clamp 62 which is adjustable therein lengthwise of its leg portion 40. A depending standard 63 is detachably clamped in each of the clamps 62 and is supported thereby on the frame 37 for forward or rearward horizontal adjustment or for vertical adjustment with respect thereto. A topping knife 64 is secured to the lower end of each standard 63 and said knives, as best seen in Figure 4, are disposed substantially in horizontal planes and extend inwardly from the standards 63 and are provided with corresponding, adjacent cutting edges 65 the rear portions of which are disposed in spaced, substantially parallel relationship and the forward portions of which are curved outwardly with respect to one another to provide an entrance opening or mouth between the knife edges.

From the foregoing it will be readily apparent that the implement is adapted to be attached to a draft vehicle by the coupling means 7 to be drawn therebehind and so that the frame 37 will pass over a row of growing beets, as illustrated in Figure 1 and with the beets being directed into engagement with the cutting edges 65 of the knives 64 so that one or the other of said edges will cut off each of the beet tops. The rear portions of the edges 65 are disposed in sufficiently close relationship as to prevent the beet tops passing therebetween while the forward ends of the cutting edges 65 are spaced sufficiently so that none of the beet tops can be avoided thereby. As previously described, the knives 65 can be adjusted forwardly or rearwardly and vertically with respect to the frame 37 so that the beet tops will be cut off at the heel or top of the beet body and also so that the slats 60 at the end of the conveyer chain 59 that passes over the upper faces of the blades 64 will be in sufficiently close proximity thereto to carry each of the beet tops rearwardly over one or the other or both of the blades 64 and so that the beet tops will be deposited rearwardly thereof to be engaged and subsequently picked up by the tines 24 and discharged into the windrow, as previously described.

Various modifications and changes are contemplated and may obviously be resorted to, without departing from the spirit or scope of the invention as hereinafter defined by the appended claims.

We claim as our invention:

1. In a beet harvester, a beet harvester frame, a shaft journaled transversely in the beet harvester frame, power take-off means connecting said shaft to a driven means of the beet harvester, a frame pivotally supported at its rear end on said shaft for vertical swinging movement within the harvester frame, said last mentioned frame having adjustable supporting means for adjustably supporting the forward end thereof at various elevations with respect to the harvester frame and to the ground, a shaft journaled in said last mentioned frame and disposed transversely of the harvester, a driven endless conveyer, means keyed to each of said shafts and over which said endless conveyer is trained and by which said endless conveyer is driven from the first mentioned shaft, a pair of standards supported by the last mentioned frame and between which a portion of the endless conveyer and said means keyed to the last mentioned shaft is disposed, means for adjusting said standard horizontally in directions forwardly and rearwardly of the last mentioned frame and vertically thereof, and blade members fixed to the lower ends of said standards and having inner, forwardly diverging cutting edges adapted for cutting the tops from beets of a beet row along which the blade members are movable, and said blade members being positioned relatively to said last mentioned frame by the adjustable supporting means of the standards whereby the cut beet tops will be engaged by said endless conveyer and conveyed rearwardly of the harvester from said blades.

2. In a beet topping machine, in combination with a wheeled machine frame, an auxiliary frame pivotally supported at its rear end on the wheeled frame, a plurality of vertically spaced links pivotally connected at corresponding ends thereof to the auxiliary frame and extending forwardly therefrom, means mounted on the machine frame to which the forward ends of the links are pivotally and adjustably connected and combining with the links for adjustably supporting the forward end of said auxiliary frame for vertical adjustment with respect to the wheeled frame, a driven endless conveyer supported by said auxiliary frame, and a pair of beet topping knives supported by the auxiliary frame and having cutting edges disposed for movement along a row of growing beets for cutting off the beet tops thereof, said endless conveyer having a portion movable over the upper surfaces of said knives for engaging and propelling the cut beet tops therefrom and in a direction rearwardly of the machine.

ARNOLD PIEL.
ADAM PIEL.
SAM PIEL.
FERDINAND PIEL.
EDWARD PIEL.

REFERENCES CITED

The following references are of record in the file of this patent:

UNITED STATES PATENTS

| Number | Name | Date |
|---|---|---|
| 856,394 | Conner | June 11, 1907 |
| 955,019 | Ufford | Apr. 12, 1910 |
| 1,001,215 | Murphy | Aug. 22, 1911 |
| 1,107,603 | Gardner | Aug. 18, 1914 |
| 1,165,763 | Deyl | Dec. 28, 1915 |
| 2,139,802 | Catchpole | Dec. 13, 1938 |
| 2,435,910 | Trinkle et al. | Feb. 10, 1948 |